United States Patent
Crews

(10) Patent No.: US 9,038,719 B2
(45) Date of Patent: May 26, 2015

(54) RECONFIGURABLE CEMENT COMPOSITION, ARTICLES MADE THEREFROM AND METHOD OF USE

(75) Inventor: James Crews, Willis, TX (US)

(73) Assignee: Baker Hughes Incorporated, Houston, TX (US)

(*) Notice: Subject to any disclaimer, the term of this patent is extended or adjusted under 35 U.S.C. 154(b) by 410 days.

(21) Appl. No.: 13/236,686

(22) Filed: Sep. 20, 2011

(65) Prior Publication Data

US 2013/0000903 A1    Jan. 3, 2013

Related U.S. Application Data

(63) Continuation-in-part of application No. 13/173,992, filed on Jun. 30, 2011.

(51) Int. Cl.
| | |
|---|---|
| E21B 33/13 | (2006.01) |
| E21B 43/28 | (2006.01) |
| C23F 11/18 | (2006.01) |
| E21B 43/02 | (2006.01) |

(Continued)

(52) U.S. Cl.
CPC .............. *E21B 43/025* (2013.01); *C04B 28/06* (2013.01); *C04B 14/34* (2013.01); *C04B 38/04* (2013.01); *C09K 8/473* (2013.01); *E21B 33/13* (2013.01); *E21B 33/138* (2013.01)

(58) Field of Classification Search
CPC ....... E21B 33/14; E21B 33/138; C04B 28/16; C04B 14/34; C04B 38/04; C09K 8/473
USPC ................... 166/102, 376, 317, 285; 175/87; 507/270, 271
See application file for complete search history.

(56) References Cited

U.S. PATENT DOCUMENTS 3,573,071 A * 3/1971 Horton et al. ................... 6/38.3
3,852,045 A   12/1974 Wheeler et al.
(Continued)

FOREIGN PATENT DOCUMENTS

WO    WO 2010076344 A1 * 7/2010

OTHER PUBLICATIONS

B. Vidick, S. James and B. Drochon; "An Alternative to Sand-Control Screens: Is Permeable Cement a Viable Option?"; SPE Drilling & Completion, Sep. 2008, pp. 229-234.

(Continued)

*Primary Examiner* — Jennifer H Gay
(74) *Attorney, Agent, or Firm* — Cantor Colburn LLP

(57) ABSTRACT

A pourable aqueous cement composition is disclosed. The cement composition comprises a hydraulic cement, water and a selectively removable material comprising a plurality of selectively corrodible metal powder particles dispersed within the cement or a nanomatrix powder compact, or a combination thereof. An article, including a downhole article, and more particularly a reconfigurable downhole article is disclosed. The article includes a hydraulic cement, wherein the hydraulic cement has at least partially set into a permanent form. The article also includes a selectively removable material dispersed within the cement, the selectively removable material comprising a plurality of selectively corrodible metal powder particles dispersed within the cement or a nanomatrix powder compact, or a combination thereof, wherein the selectively removable material is configured for removal in response to a predetermined wellbore condition.

36 Claims, 8 Drawing Sheets

(51) Int. Cl.
*C04B 28/06* (2006.01)
*C04B 14/34* (2006.01)
*C04B 38/04* (2006.01)
*C09K 8/473* (2006.01)
*E21B 33/138* (2006.01)

(56) References Cited

U.S. PATENT DOCUMENTS

| | | | | |
|---|---|---|---|---|
| 3,990,903 | A * | 11/1976 | Mallow | 106/624 |
| 4,828,771 | A * | 5/1989 | Kishima et al. | 264/41 |
| 4,829,152 | A | 5/1989 | Rostoker et al. | |
| 5,039,645 | A * | 8/1991 | Elliott et al. | 502/217 |
| 5,425,424 | A | 6/1995 | Reinhardt et al. | |
| 5,479,986 | A * | 1/1996 | Gano et al. | 166/292 |
| 5,529,123 | A | 6/1996 | Carpenter et al. | |
| 5,685,372 | A * | 11/1997 | Gano | 166/292 |
| 5,765,641 | A * | 6/1998 | Shy et al. | 166/292 |
| 6,161,622 | A * | 12/2000 | Robb et al. | 166/386 |
| 6,202,751 | B1 | 3/2001 | Chatterji et al. | |
| 6,288,174 | B1 * | 9/2001 | Ikegami et al. | 525/301 |
| 6,364,945 | B1 * | 4/2002 | Chatterji et al. | 106/677 |
| 6,761,218 | B2 * | 7/2004 | Nguyen et al. | 166/278 |
| 7,032,663 | B2 | 4/2006 | Nguyen | |
| 7,044,224 | B2 | 5/2006 | Nguyen | |
| 7,093,664 | B2 * | 8/2006 | Todd et al. | 166/376 |
| 7,156,174 | B2 * | 1/2007 | Roddy et al. | 166/293 |
| 7,461,699 | B2 * | 12/2008 | Richard et al. | 166/376 |
| 7,497,258 | B2 * | 3/2009 | Savery et al. | 166/292 |
| 7,527,103 | B2 * | 5/2009 | Huang et al. | 166/311 |
| 7,637,319 | B2 * | 12/2009 | Savery et al. | 166/292 |
| 7,640,985 | B2 * | 1/2010 | Savery et al. | 166/292 |
| 7,762,342 | B2 * | 7/2010 | Richard et al. | 166/376 |
| 7,775,286 | B2 * | 8/2010 | Duphorne | 166/376 |
| 7,784,542 | B2 * | 8/2010 | Roddy et al. | 166/293 |
| 7,900,696 | B1 * | 3/2011 | Nish et al. | 166/133 |
| 7,909,096 | B2 * | 3/2011 | Clark et al. | 166/250.17 |
| 8,047,288 | B2 * | 11/2011 | Skala et al. | 166/280.2 |
| 8,157,009 | B2 * | 4/2012 | Patil et al. | 166/293 |
| 8,220,538 | B2 * | 7/2012 | Wee | 166/179 |
| 8,342,240 | B2 * | 1/2013 | Richard et al. | 166/205 |
| 8,377,278 | B1 * | 2/2013 | Cardenas | 204/515 |
| 8,425,651 | B2 * | 4/2013 | Xu et al. | 75/245 |
| 8,586,512 | B2 * | 11/2013 | Roddy et al. | 507/271 |
| 8,603,952 | B2 * | 12/2013 | Roddy et al. | 507/269 |
| 8,672,041 | B2 | 3/2014 | Duphorne | |
| 2003/0230407 | A1 * | 12/2003 | Vijn et al. | 166/292 |
| 2004/0231845 | A1 | 11/2004 | Cooke, Jr. | |
| 2005/0092363 | A1 * | 5/2005 | Richard et al. | 137/73 |
| 2005/0145141 | A1 | 7/2005 | Nguyen et al. | |
| 2005/0167105 | A1 * | 8/2005 | Roddy et al. | 166/293 |
| 2005/0205265 | A1 * | 9/2005 | Todd et al. | 166/376 |
| 2006/0169452 | A1 * | 8/2006 | Savery et al. | 166/280.2 |
| 2007/0017675 | A1 * | 1/2007 | Hammami et al. | 166/278 |
| 2008/0149345 | A1 * | 6/2008 | Marya et al. | 166/376 |
| 2008/0153940 | A1 * | 6/2008 | Scheer et al. | 523/124 |
| 2008/0246174 | A1 | 10/2008 | Danican et al. | |
| 2008/0296024 | A1 * | 12/2008 | Huang et al. | 166/311 |
| 2009/0081122 | A1 * | 3/2009 | Rufenacht et al. | 424/1.29 |
| 2009/0124522 | A1 * | 5/2009 | Roddy | 507/269 |
| 2009/0137433 | A1 * | 5/2009 | Smith et al. | 507/271 |
| 2009/0255686 | A1 * | 10/2009 | Richard et al. | 166/376 |
| 2010/0016183 | A1 * | 1/2010 | Roddy et al. | 507/225 |
| 2010/0139919 | A1 | 6/2010 | Yeh et al. | |
| 2010/0272649 | A1 * | 10/2010 | Nies et al. | 424/9.4 |
| 2010/0294510 | A1 * | 11/2010 | Holmes | 166/376 |
| 2011/0077176 | A1 * | 3/2011 | Smith et al. | 507/271 |
| 2011/0107942 | A1 * | 5/2011 | Eleto Da Silva et al. | 106/638 |
| 2011/0132143 | A1 | 6/2011 | Xu et al. | |
| 2012/0031308 | A1 * | 2/2012 | Fradera Pellicer | 106/784 |
| 2012/0107590 | A1 * | 5/2012 | Xu et al. | 428/220 |
| 2012/0211239 | A1 * | 8/2012 | Kritzler et al. | 166/372 |
| 2012/0247765 | A1 * | 10/2012 | Agrawal et al. | 166/280.2 |
| 2012/0276356 | A1 * | 11/2012 | Xu et al. | 428/218 |
| 2013/0000903 | A1 * | 1/2013 | Crews | 166/285 |
| 2013/0000985 | A1 * | 1/2013 | Agrawal et al. | 175/87 |
| 2013/0004664 | A1 * | 1/2013 | Agrawal et al. | 427/192 |
| 2014/0124215 | A1 | 5/2014 | Duphorne et al. | |

OTHER PUBLICATIONS

Araki, Kiyoshi and Halloran, John: "Ceramic Freeze Casting Technique with Sublimable Vehicles", University of Michigan Department of Materials Science and Engineering, 105th Annual Meeting of the ACerS Apr. 29, 2003.

Nie, Xiaowu, "Patents of Methods to Prepare Intermetallic Matrix Composites: A Review", Recent Patents on Materials Science, 2008, 1, 232-240.

* cited by examiner

RECONFIGURABLE CEMENT COMPOSITION, ARTICLES MADE THEREFROM AND METHOD OF USE

CROSS REFERENCE TO RELATED APPLICATIONS

This application is a continuation in part of co-pending patent application Ser. No. 13/173,992 filed on Jun. 30, 2011; which is assigned to the same assignee as this application, Baker Hughes Incorporated of Houston, Tex., and incorporated herein by reference in its entirety.

BACKGROUND

In the well drilling, completion and production arts, it is frequently desirable to employ articles, such as downhole tools and components, which can be reconfigured in the downhole environment to perform more than one function. For example, it may be desirable for a downhole article to have one configuration during one operation, such as drilling, and another configuration during other operations, such as completion or production.

SUMMARY

In an exemplary embodiment, a pourable aqueous cement composition is disclosed. The cement composition comprises a hydraulic cement, water and a selectively removable material comprising a plurality of selectively corrodible metal powder particles dispersed within the cement or a nanomatrix powder compact, or a combination thereof.

In another exemplary embodiment, an article, including a downhole article, and more particularly a reconfigurable downhole article is disclosed. The article includes a hydraulic cement, wherein the hydraulic cement has at least partially set into a permanent form. The article also includes a selectively removable material dispersed within the cement, the selectively removable material comprising a plurality of selectively corrodible metal powder particles dispersed within the cement or a nanomatrix powder compact, or a combination thereof, wherein the selectively removable material is configured for removal in response to a predetermined wellbore condition.

In yet another exemplary embodiment, a method of forming a reconfigurable cement article is disclosed. The method includes forming a pourable aqueous cement composition comprising a mixture of: a hydraulic cement, water; and a selectively removable material comprising a plurality of selectively corrodible metal powder particles dispersed within the cement or a nanomatrix powder compact, or a combination thereof. The method also includes pouring the cement composition into a space form that is configured to receive it to form the article.

BRIEF DESCRIPTION OF THE DRAWINGS

Referring now to the drawings wherein like elements are numbered alike in the several Figures.

DETAILED DESCRIPTION

Figure 1A:
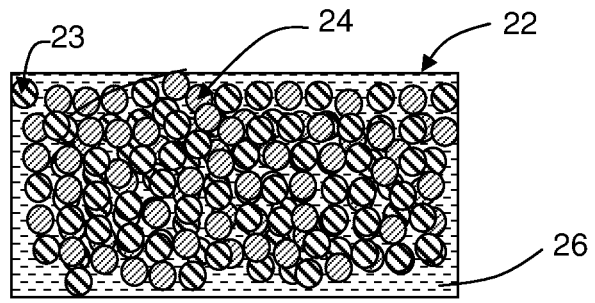
FIGS. 1A-1D are schematic cross-sectional illustrations of a second exemplary embodiment of a reconfigurable cement article and method of forming the reconfigurable cement article as disclosed herein.

Referring to FIGS. 1-12, reconfigurable cement articles 10 and a method of making or forming 300 reconfigurable cement articles 10 from pourable cement compositions 22 are disclosed. The method may be used to make and use reconfigurable cement articles for any application, but are particularly useful for making various reconfigurable downhole cement articles 10, including downhole tools and components and fixtures, for use in well drilling, completion and production operations. Even more particularly, the methods are useful for making cement articles 10 that can be used downhole by being reconfigured to provide a predetermined porosity 11, including a surface porosity 12, or internal porosity 14, or a combination thereof. In particular, the porosity may extend in an open-cell network of porosity 11 through the cement article 10. The reconfigurable cement articles 10 comprise as-cast or as-poured base cement articles 20 with base features and performance characteristics that can be reconfigured to provide reconfigured cement articles 40 that have different features and performance characteristics, such as fluid permeability, and more particularly the predetermined porosity 11, including surface porosity 12 or internal porosity 14, or a combination thereof. The method of forming is used to make a base cement article 20 that includes a cement composition 22. The cement composition 22 comprises a matrix of cement 23. The cement composition 22 also includes a selectively removable material 24 disposed in the matrix of the cement 23 that enables reconfiguration of the base cement article 20 by the selective removal of the removable material to form a fluid permeable cement article 40 that includes the predetermined porosity 11. The method of forming 300 includes reconfiguring the base cement article 20 to form the fluid permeable cement article 40, and more particularly forming a base cement article 20 comprising a downhole tool or component or fixture or downhole as part of a well drilling, completion or production operation and then reconfiguring the base cement article 20 to form the fluid permeable cement article 40. Reconfiguring the base cement article 20 to form the fluid permeable cement article 40 may be performed in any suitable manner, and more particularly may include exposing the base cement article 20 to a suitable wellbore condition 50, including a temperature, pressure or chemical condition, or a combination thereof, to remove the removable material 24, including removal by various dissolution or corrosion processes, and even more particularly by exposure of a base downhole tool or component or fixture to a predetermined wellbore fluid 60 to remove the removable material 24 by dissolution or corrosion. These and other aspects of the reconfigurable cement articles 10 and a method of forming 300 them are described further below.

Figure 1B:
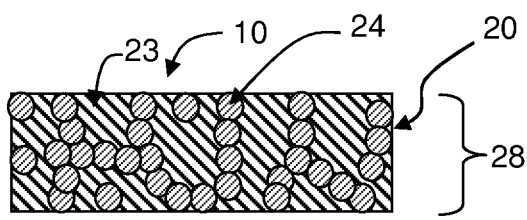
Figure 1C:
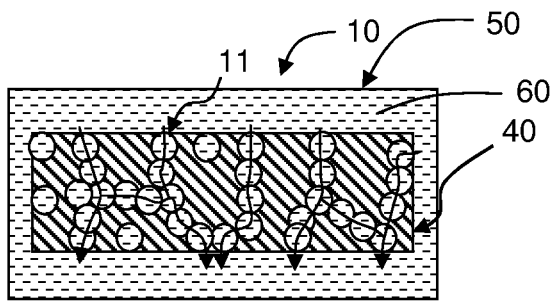
Figure 1D:
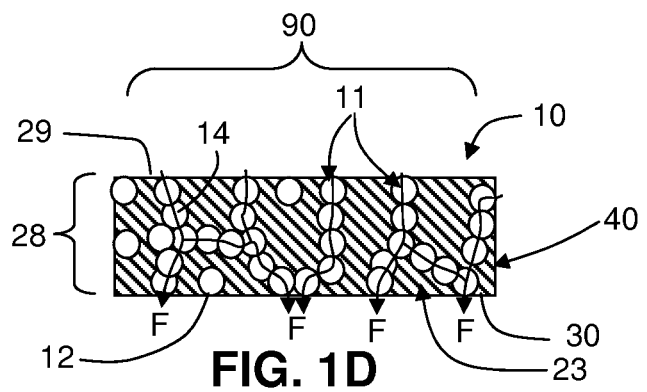
Figure 2:
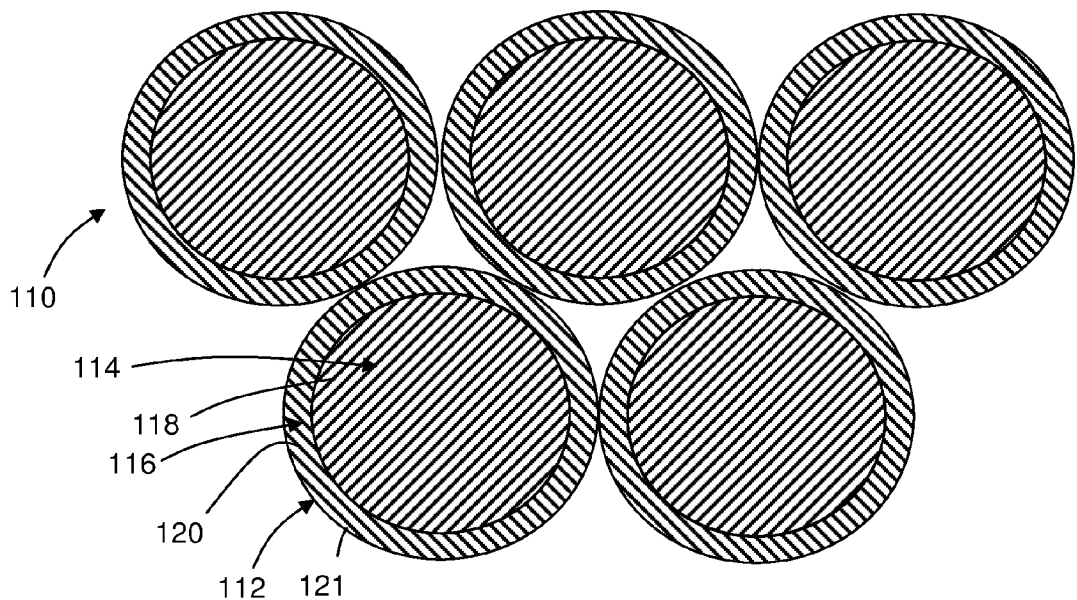
FIG. 2 is a schematic illustration of an exemplary embodiment of a powder and powder particles of a removable material as disclosed herein.
Figure 3:
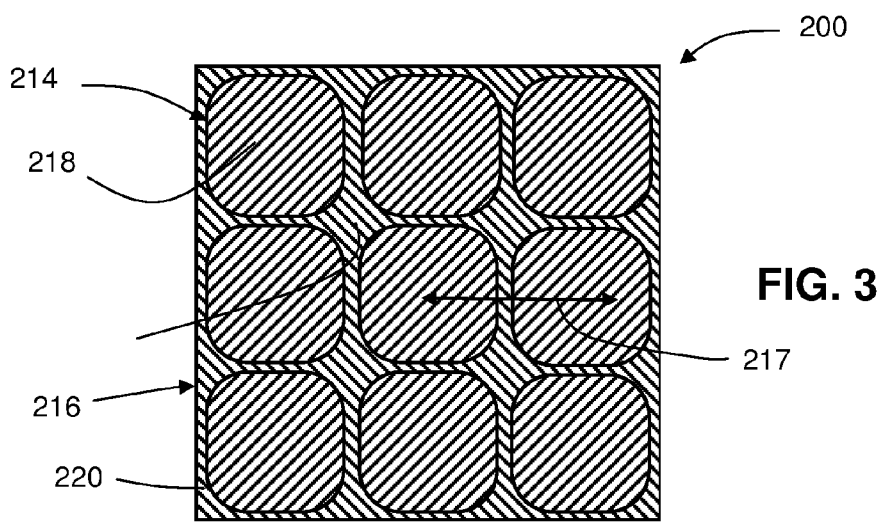
FIG. 3 is a schematic cross-sectional illustration of an exemplary embodiment of a powder compact of a removable material as disclosed herein.
Figure 4:
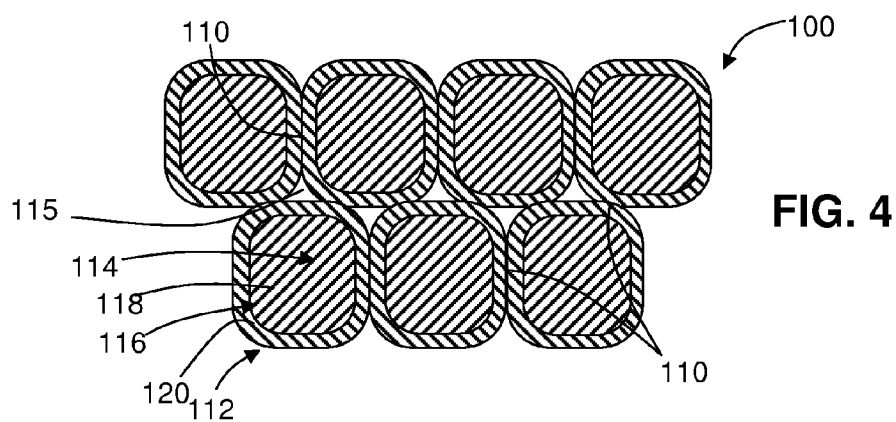
FIG. 4 is a schematic cross-sectional illustration of an exemplary embodiment of a precursor powder compact of a removable material as disclosed herein.
Figure 5:
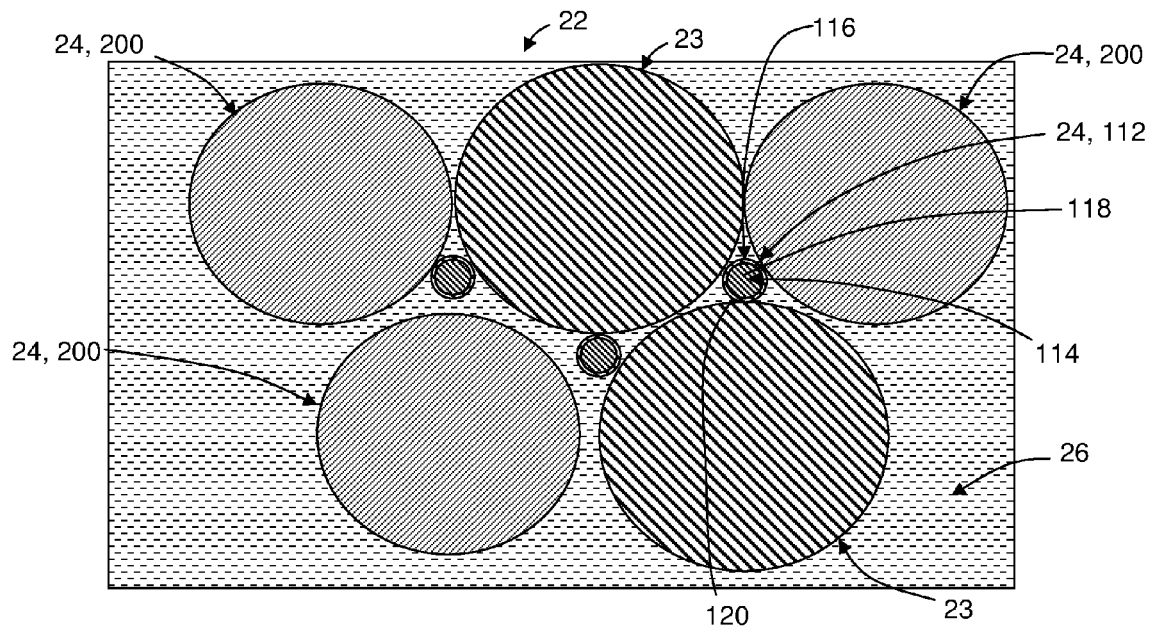
FIG. 5 is a schematic cross-sectional illustration of an exemplary embodiment of a pourable aqueous cement composition comprising a mixture of a cement, water and a removable material as disclosed herein.
Figure 6:
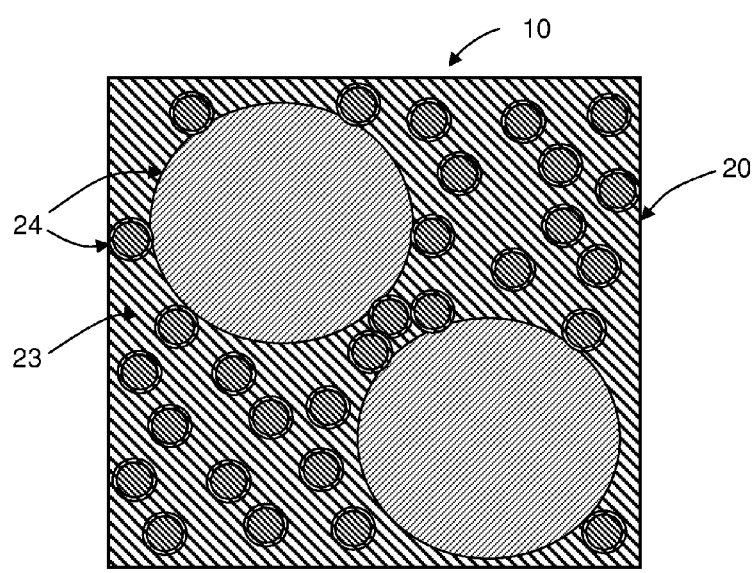
FIG. 6 is a schematic cross-sectional illustration of an exemplary embodiment of a reconfigurable article comprising a removable material and base cement material as disclosed herein.

Referring to the Figures, and more particularly to FIGS. 1A-1D, in an exemplary embodiment, a reconfigurable downhole cement article 10 includes a matrix of hydraulic cement 23 and a removable material 24 (FIG. 1B). The removable material 24 may be disposed the matrix of hydraulic cement 23 and is configured for removal from the matrix of hydraulic cement 23 in response to a wellbore condition 50 (FIG. 1C). The matrix of hydraulic cement 23 and the removable material 24 define a base cement article 20 that is configured to perform a first function in the wellbore. Upon removal of the removable material 24 (FIG. 1C), the matrix of hydraulic cement 23 defines a fluid permeable cement article 40 that is configured to perform a second function that may be different than the first function (FIG. 1D). In an exemplary embodiment, the base cement article 20 (FIG. 1B) may include a first downhole tool or component that is configured to perform a first function and the fluid permeable cement article 40 (FIG. 1D) may include a second downhole tool or component that has a feature (i.e., fluid permeability) that is not found in the base cement article 20 and that is configured to perform a second function. As an example, the matrix of hydraulic cement 23 and removable material 24 may define a base cement article 20 that includes a solid wall section 28 or surface 30 of the base cement article 20. Upon removal of the removable material 24, the fluid permeable cement article 40 may include a feature (or plurality of features) not found in the base cement article 20 that enable the fluid permeable cement article 40 to perform a function (or plurality of functions) different than those of the base cement article 20, such providing a porous conduit, filter or screen, or a combination thereof. In another exemplary embodiment, a reconfigurable downhole cement article 10 that includes a base cement article 20 and a fluid permeable cement article 40 may also be described in the following manner. The base cement article 20 includes a matrix of hydraulic cement 23 and a removable material 24. In one embodiment, as illustrated in FIG. 6, the removable material 24 may include a plurality of dispersed particles 112, wherein the dispersed particles include a particle core 114 formed from a particle core material 118 as described herein and illustrated in FIG. 2. In another embodiment, as also illustrated in FIG. 6, the removable material 24 may include a powder compact 200, as illustrated in FIG. 3, of a material that includes a substantially-continuous, cellular nanomatrix 216 comprising a nanomatrix material 220, a plurality of dispersed particles 214 comprising a particle core material 118 that comprises Mg, Al, Zn, Fe or Mn, or a combination thereof, as described herein, dispersed in the cellular nanomatrix 216; and a bond layer extending throughout the cellular nanomatrix 216 between the dispersed particles as described herein. The powder compact 200 material comprising the cellular nanomatrix 216 may be incorporated in any shape or form, including as particles of any size or shape; including regular or irregular shapes; continuous or discontinuous wires, fibers, mesh, screen or the like. In yet another embodiment, the removable material 24 may include a combination of coated particles and nanomatrix materials (FIG. 6) and may be made from a cement composition 22 that includes both coated particles and nanomatrix materials (FIG. 5). The reconfigurable cement article 10 also includes a fluid permeable cement article 40 comprising the matrix of hydraulic cement 23, wherein the base cement article 20 is configured for irreversible transformation to the fluid permeable cement article 40 by removal of the removable material 24 as illustrated generally in FIGS. 1A-6.

A pourable aqueous cement composition (FIG. 1A, 5) may be formed by any suitable method. In an exemplary embodiment a slurry or mixture 22 comprising powders of the removable material 24 and the matrix of hydraulic cement 23 and water 26 may be mixed using conventional cement mixing equipment. The aqueous cement composition may then be pumped and placed by various conventional cement pumps and tools to any desired location within the wellbore to fill any desired shape form. Once the pourable aqueous cement composition 22 has assumed the shape form of the desired downhole article, the cement composition will be allowed to set and form a permanent shape of the base cement article 20. The base cement article 20 may then be exposed to a predetermined wellbore condition 50, such as a predetermined wellbore fluid 60 as shown in FIGS. 1C and 1D, to cause the removal of the removable material 24 and define the fluid permeable cement article 40. The remaining matrix of hydraulic cement 23 has a predetermined porosity 11 defined by the space formerly occupied by the removable material 24. Where the matrix of hydraulic cement 23 and removable material 24 powders comprise a homogeneous mixture, the porosity in the matrix of hydraulic cement 23 will be homogeneous. If the mixture is heterogeneous, the porosity will also be heterogeneous. The fluid permeable cement article 40 may comprise a stand-alone component as illustrated in FIGS. 1A-1D, or may be disposed, attached to or otherwise associated with another article as a substrate, as described herein as illustrated in FIGS. 7A-11B. In one embodiment, the predetermined porosity 11 may include internal porosity 14 that extends from a first surface 29 through a wall section 29 of the article to a second surface 30 (FIG. 1D). In certain embodiments, the internal porosity 14 may provide a network 90 of porosity that provides a tortuous fluid flow path for a fluid (F), such as an open-cell network 90 of pores that provide a plurality of paths through fluid permeable cement article 40 as also illustrated in FIG. 1D. Such an embodiment may be used to define a fluid permeable wall or porous barrier, and may also serve as a screen or filter with regard to the movement of fluids within the wellbore through the wall section that may contain particulates. The characteristics of the porosity that may be formed, including the pore size, will be determined by relative sizes and amounts (e.g., volume percent) and shapes of the particles of the matrix of hydraulic cement 23 and removable material 24 used (FIG. 5). In one embodiment, the powder particles of the removable material 24 may comprise particles having an average particle size defining nanometer (e.g., about 1 to about 1000 nm) and micrometer (e.g., about 1 to about 1000 micrometer) size powder particles. In other embodiments, the removable material 24 may comprise much larger particles, including those that have an average particle size defining millimeter (e.g., about 1 to about 50 mm) size powder particles or pellets, that may themselves be formed, for example, as powder compacts 200 of smaller particle size powders, as described herein and illustrated generally in FIG. 5. The removable material 24 particles may have any suitable shape. They may include all manner of shapes, including spherical or non-spherical particle shapes, and may also include elongated shapes, including rods; plates; wires or fibers, including continuous and discontinuous wires or fibers; mesh, screens and the like.

As indicated, the matrix of hydraulic cement 23 and removable material 24 may be selected to produce relatively small size porosity, or microporosity, reflective of small size particles of the removable material 24 including nanometer and micrometer size porosity, but may also be selected to produce relatively large size porosity, or macroporosity, reflective of millimeter or larger size particles, or inserts of any size or shape that are partially or completely embedded within the matrix of hydraulic cement 23 and that may be removed to form various features in the cement 23.

The matrix of hydraulic cement 23 may include any cementitious material suitable for forming the base cement article 20 and fluid permeable cement article 40, particularly where these article are intended for use a various downhole tools or components. It may also include various filler materials, including polymer, ceramic and metal filler or reinforcing materials. In one embodiment, the matrix of hydraulic cement 23, including fillers or reinforcing materials, may include a metal, polymer, cement, mortar or concrete, or a combination thereof, as described herein.

Suitable hydraulic cements 23, including mortars and concretes, include those typically employed in a wellbore environment to form downhole tools and components, including various casings, seals, plugs, packings, liners and the like. Various hydraulic cements and mortars are suitable in the compositions and methods disclosed herein, including those comprised of calcium, aluminum, silicon, oxygen, and/or sulfur, which set and harden by reaction with water 26. Such hydraulic cements include, but are not limited to, Portland cements, pozzolana cements, gypsum cements, high alumina content cements, silica cements, and high alkalinity cements. Portland cements are particularly useful. In some embodiments, the Portland cements that are suited for use are classified as Class A, B, C, G, and H cements according to American Petroleum Institute, API Specification for Materials and Testing for Well Cements. The teaching herein related to cement compositions may also be used for many mortar compositions for substituting the reference to "cement" for "mortar".

Certain low-density cements may also be used, including foamed cements or cements whose density has been reduced by another means including microspheres, low-density polymer beads, or other density-reducing additives. If a low-density cement is utilized, then a mixture of foaming and foam stabilizing dispersants may also be used. Generally, the mixture may be included in the cement compositions of the present invention in an amount in the range of from about 1% to about 5% by volume of water 26 in the composition. Low-density cements may be used to reduce the potential of fracturing the walls of the wellbore during placement of the cement in the annulus, for example.

The cement component 23 of the cement compositions 22 of the present invention may include about 20% to about 80% of the weight of the composition 22, preferably from about 30% to about 60%. In one embodiment, the removable material 24 may be substituted for the cement component 23 of the cement composition 22 in an amount of about 1 to about 70% of the cement component (i.e., about 0.2 to about 64% by weight of the composition), and more particularly about 10 to about 65% of the cement component (i.e., about 2% to about 45.5% by weight of the composition). The water 26 utilized in the cement compositions of this invention can be fresh water, salt water (e.g., water containing one or more salts dissolved therein), brine (e.g., saturated salt water), or seawater. Generally, the water 26 can be from any source provided that it does not contain an excess of compounds that adversely affect other components in the pourable cement composition 22. The water 26 preferably is present in an amount sufficient to form pourable cement composition 22 as a pumpable slurry. More particularly, the water 26 is present in the cement compositions in an amount in the range of from about 15% to about 60% by weight of cement composition 22 therein, more preferably in an amount of about 20% to about 45%. Optionally, a dispersant may be included in the cement compositions of the present invention. If used, the dispersant should be included in the composition in an amount effective to aid in dispersing the cement and the removable material 24 within the composition. In certain embodiments, about 0.1% to about 5% dispersant by weight of the composition is suitable. In other embodiments, a different range may be suitable. Examples of suitable dispersants include but are not limited to naphthalene sulfonate formaldehyde condensates, acetone formaldehyde sulfite condensates, and glucan delta lactone derivatives. Other dispersants may also be used depending on the application of interest. In order to control fluid loss from a cement composition of this invention during placement, a fluid loss control additive can be included in the composition. Examples of suitable cement slurry fluid loss control additives include those that are liquids or can be dissolved or suspended or dispersed in liquids. These include but are not limited to latex, latex copolymers, modified synthetic polymers and copolymers, natural gums and their derivatives, derivatized cellulose, and starches. Other fluid loss control additives may be suitable for a given application, including amounts ranging from about 0% to about 25% by weight of the cement composition. Other additives such as setting accelerators (such as triethanolamines, calcium chloride, potassium chloride, sodium formate, sodium nitrate, and other alkali and alkaline earth metal halides, formates, nitrates, and sulfates), setting retardants (such as sodium tartrate, sodium citrate, sodium gluconate, sodium itaconate, tartaric acid, citric acid, gluconic acid, lignosulfonates, and synthetic polymers and copolymers), foamers, extenders, weighting agents, thixotropic additives, suspending agents, degradation agent to control the degradation of the removable material 24 or the like may also be included in the cement compositions 22 disclosed herein. The cements described herein also may encompass various concretes by the further addition of aggregates, such as a coarse aggregate made of gravel or crushed rocks such as chert, quartzite, granite, and/or a fine aggregate such as sand or crushed sand. Aggregate may be added in an amount of about 10% to 70% of the cement composition 22, and more particularly about 20% to 40%. The removable material may also be substituted for a portion of the aggregate, including the same ranges described above as may be substituted for the cement component.

The matrix of hydraulic cement 23 will preferably have a substantially lower corrosion rate in response to a predetermined wellbore condition 50, such as a predetermined wellbore fluid 60, than the removable material 24. This enables the selective and rapid removal of the removable material 24 to form the fluid permeable cement article 40 and form the features described above, while allowing the fluid permeable cement article 40 comprising the matrix of hydraulic cement 23 to be utilized for its intended function for a predetermined period of time including an operating lifetime or critical service time. In one embodiment, the difference in the corrosion rates of the removable materials 24 and the cement 23 allows the fluid permeable cement article 40, such as a downhole cement article 10, to be utilized for its intended purpose, such as a specific wellbore operation, in the presence of the predetermined wellbore fluid 60 and provides an operating lifetime or critical service time in the predetermined wellbore fluid 60 that is sufficient to perform the wellbore operation. In another embodiment, the matrix of hydraulic cement 23 is substantially non-corrodible in the predetermined wellbore fluid 60 so that the fluid permeable cement article 40 may be used in the wellbore for an indefinite period of time. The second corrosion rate of the cement 23 in the predetermined wellbore fluid 60 may be any suitable rate that is lower than the first corrosion rate of the removable material 24, more particularly it may be lower by about one to about ten orders of magnitude, and more particularly by about three to about seven orders of magnitude. This may include corrosion rates of about 0.001 $mg/cm^2/hr$ to about 1.0 $mg/cm^2/hr$, for example. One non-limiting example of further decreasing the corrodibility of the matrix of hydraulic cement 23 to wellbore fluid 60, such as to a brine or an acid, is by the inclusion of latex, latex copolymer, and the like into the pourable cement composition 22 such that it is incorporated into the cement 23.

In one embodiment, the removable material 24 may be provided in the form of a powder comprising a plurality of particles 112 of the removable material 24 that may be formed into a powder compact 200 (i.e., pressed and sintered that is substantially fully dense) of the removable material 24, or a precursor compact 100 (i.e., pressed but not sintered that is porous and less than fully dense), or may be used as a loose powder 110 as described herein. In another embodiment, the removable material 24 may be provided in the form of a powder comprising a mixture of a plurality of particles of the matrix of hydraulic cement 23 and removable material 24 and may be formed into a powder compact of the matrix of hydraulic cement 23 and the removable material 24.

The base cement article 20 may comprise a selectively corrodible removable material 24. The removable material 24 may include a metallic material that may be selectively and rapidly corroded by a predetermined wellbore condition 50, including a predetermined wellbore fluid 60. More particularly, the selectively corrodible metallic material may include a powder compact 200 of various metallic nanomatrix composite materials as described in commonly owned, co-pending U.S. patent application Ser. No. 12/633,682 filed on Dec. 8, 2009 and Ser. No. 13/194,361 filed on Jul. 29, 2011, which are incorporated herein by reference in their entirety. Referring to FIG. 3, the nanomatrix composites are powder compacts 200 that may be formed from a metallic powder 110 that includes a plurality of metallic, coated powder particles 112. Powder particles 112 may be formed to provide a powder 110, including free-flowing powder, that may be poured or otherwise mixed into the slurry mixture described herein, and may also be used to form powder compacts 200 (FIG. 3), and precursor powder compacts 100 (FIG. 4) as described herein, in the various forms described herein that may also be mixed or placed into the pourable cement composition described herein.

The metallic coated powder particles 112 of powder 110 includes a particle core 114 and a metallic coating layer 116 of a metallic coating layer material 120 disposed on the particle core 114. The particle core 114 includes a core material 118. The core material 118 may include any suitable material for forming the particle core 114 that provides powder particle 112 that can be sintered to form a lightweight, high-strength powder compact 200 having selectable and controllable dissolution characteristics. In one embodiment, suitable core materials 118 include electrochemically active metals having a standard oxidation potential greater than or equal to that of Zn, and in another embodiment include Mg, Al, Mn, Fe or Zn, or alloys thereof, or a combination thereof, wherein the metallic coating layer material 120 has a chemical composition and the particle core material 118 has a chemical composition that is different than the chemical composition of the metallic coating material 120. Core material 118 may also include other metals that are less electrochemically active than Zn or non-metallic materials, or a combination thereof. Suitable non-metallic materials include ceramics, composites, glasses or carbon, or a combination thereof. Core material 118 may be selected to provide a high dissolution rate in a predetermined wellbore fluid 60, but may also be selected to provide a relatively low dissolution rate, including zero dissolution, where dissolution of the nanomatrix material causes the particle core 114 to be rapidly undermined and liberated from the particle compact at the interface with the wellbore fluid 60, such that the effective rate of dissolution of particle compacts made using particle cores 114 of these core materials 118 is high, even though core material 118 itself may have a low dissolution rate, including core materials 118 that may be substantially insoluble in the wellbore fluid 60.

Each of the metallic, coated powder particles 112 of powder 110 also includes a metallic coating layer 116 that is disposed on particle core 114. Metallic coating layer 116 includes a metallic coating material 120. Metallic coating material 120 gives the powder particles 112 and powder 110 its metallic nature. Metallic coating layer 116 is a nanoscale coating layer. In an exemplary embodiment, metallic coating layer 116 may have a thickness of about 25 nm to about 2500 nm. The thickness of metallic coating layer 116 may vary over the surface of particle core 114, but will preferably have a substantially uniform thickness over the surface of particle core 114. Metallic coating layer 116 may include a single layer or a plurality of layers as a multilayer coating structure. Metallic coating material 120 may include any suitable metallic coating material 120, and in certain embodiments provides a sinterable outer surface 121 that is configured to be sintered to an adjacent powder particle 112 that also has a metallic coating layer 116 and sinterable outer surface 121. In an exemplary embodiment of a powder 110, particle core 114 includes Mg, Al, Mn, Fe or Zn, or alloys thereof, or a combination thereof, as core material 118, and more particularly may include pure Mg and Mg alloys, and metallic coating layer 116 includes Al, Zn, Mn, Mg, Mo, W, Cu, Fe, Si, Ca, Co, Ta, Re, or Ni, or alloys thereof, or an oxide, nitride or a carbide thereof, or a combination of any of the aforementioned materials as coating material 120.

As used herein, the use of the term substantially-continuous cellular nanomatrix 216 does not connote the major constituent of the powder compact, but rather refers to the minority constituent or constituents, whether by weight or by volume. This is distinguished from most matrix composite materials where the matrix comprises the majority constituent by weight or volume. The use of the term substantially-continuous, cellular nanomatrix is intended to describe the extensive, regular, continuous and interconnected nature of the distribution of nanomatrix material 220 within powder compact 200. As used herein, "substantially-continuous" describes the extension of the nanomatrix material throughout powder compact 200 such that it extends between and envelopes substantially all of the dispersed particles 214. Substantially-continuous is used to indicate that complete continuity and regular order of the nanomatrix around each dispersed particle 214 is not required. For example, defects in the coating layer 116 over particle core 114 on some powder particles 112 may cause bridging of the particle cores 114 during sintering of the powder compact 200, thereby causing localized discontinuities to result within the cellular nanomatrix 216, even though in the other portions of the powder compact the nanomatrix is substantially continuous and exhibits the structure described herein. As used herein, "cellular" is used to indicate that the nanomatrix defines a network of generally repeating, interconnected, compartments or cells of nanomatrix material 220 that encompass and also interconnect the dispersed particles 214. As used herein, "nanomatrix" is used to describe the size or scale of the matrix, particularly the thickness of the matrix between adjacent dispersed particles 214. The metallic coating layers that are sintered together to form the nanomatrix are themselves nanoscale thickness coating layers. Since the nanomatrix at most locations, other than the intersection of more than two dispersed particles 214, generally comprises the interdiffusion and bonding of two coating layers 116 from adjacent powder particles 112 having nanoscale thicknesses, the matrix formed also has a nanoscale thickness (e.g., approximately two times the coating layer thickness as described herein) and is thus described as a nanomatrix. Further, the use of the term dispersed particles 214 does not connote the minor constituent of powder compact 200, but rather refers to the majority constituent or constituents, whether by weight or by volume. The use of the term dispersed particle is intended to convey the discontinuous and discrete distribution of particle core material 218 within powder compact 200.

The equiaxed morphology of the dispersed particles 214 and cellular network 216 of particle layers results from sintering and deformation of the powder particles 112 as they are compacted and interdiffuse and deform to fill the interparticle spaces 115. The sintering temperatures and pressures may be selected to ensure that the density of powder compact 200 achieves substantially full theoretical density. Sintered powder compact 200 may comprise a sintered precursor powder compact 100 that includes a plurality of deformed, mechanically bonded powder particles as described herein. Precursor powder compact 100 may be formed by compaction of powder 110 to the point that powder particles 112 are pressed into one another, thereby deforming them and forming interparticle mechanical or other bonds associated with this deformation sufficient to cause the deformed powder particles 112 to adhere to one another and form a green-state powder compact having a green density that may be varied and is less than the theoretical density of a fully-dense compact of powder 110, due in part to interparticle spaces 115. Compaction may be performed, for example, by isostatically pressing powder 110 at room temperature to provide the deformation and interparticle bonding of powder particles 112 necessary to form precursor powder compact 100. The precursor powder compacts 100 and powder compacts 200 described herein may be formed herein entirely from the powder particles 112 of the removable material 24 only, or may include a mixture of a powder particles 112 of the removable material 24 and powder particles of a powder 102 of the matrix of hydraulic cement 23, as described herein.

Powder compacts 200 may also be formed from powder particles 112 by extrusion in a predetermined extrusion direction and provide a cellular nanomatrix 216 and dispersed particles 214 that are substantially elongated in the predetermined extrusion direction 217 as illustrated in FIG. 3, including microstructures that are substantially discontinuous in the predetermined extrusion direction, or lateral to the predetermined extrusion direction.

Powder compacts 200 comprising dispersed particles 214 that include Mg and cellular nanomatrix 216 that includes various nanomatrix materials as described herein demonstrate very rapid corrosion rates in 15% HCl that range from about 4750 $mg/cm^2/hr$ to about 7432 $mg/cm^2/hr$. This range of response provides, for example the ability to remove a 3 inch diameter ball formed from this material from a wellbore by altering the wellbore fluid 60 in less than one hour.

The use of corrodible removable metallic materials 24 as described herein may be utilized with any suitable matrix of hydraulic cement 23, particularly metallic, ceramic, polymeric or cementitious materials, or a combination thereof, as described herein. In one embodiment, the reconfigurable downhole cement article 10 includes a matrix of hydraulic cement 23 comprising a cement and a removable material 24 comprising a plurality of corrodible metal powder particles 112 dispersed within the cement. The metal powder particles 112 may be removed by a predetermined wellbore fluid 60, such as a brine or an acid, to provide the fluid permeable cement article 40 comprising a porous cement comprising a plurality of dispersed pores corresponding to spaces previously occupied by the corrodible metal powder particles 112. In one embodiment, the plurality of dispersed pores comprises an open cell network of interconnected pores dispersed within the cement.

In one embodiment, an open cell network 90 of interconnected pores 11 may be formed by ensuring that at least a portion of the selectively removable particles 24 are joined to one another or in touching contact with one another as illustrated generally in FIGS. 1B and 6, and particularly greater than about 50% by volume of the removable material 24, and more particularly greater than about 75% by volume of the removable material 24, and even more particularly greater than about 90% by volume of the removable material 24, and most particularly substantially all of the removable material 24 particles are joined to one another or in touching contact with one another. The formation of the three-dimensional network of removable material 24 particles that are joined to one another or in touching contact with one another facilitates the selective corrodibility of the removable material 24 and interparticle electrochemical reactions that enable the corrosion or dissolution of the cellular nanomatrix 216 as well as release or corrosion of the dispersed core particles 214 or the coated powder particles 112 by providing pathways by which the predetermined wellbore fluid 60 may penetrate the surface of the base cement article 20 to access the removable material 24 particles that are in the interior of the base cement article 20. In one example, this enable the predetermined wellbore fluid 60 to penetrate from the surface of the base cement article 20, including penetration through a wall section 28 of the base cement article 20 to remove at least a portion of the removable material 24 particles therein, and in some embodiments, substantially all of the removable material 24 particles.

In other embodiments, the selectively removable corrodible particles are not joined to one another or in touching contact with one another, but rather are substantially dispersed from one another within the matrix of hydraulic cement 23, such as a powder compact of the removable material 24 particles dispersed from one another within the matrix of hydraulic cement 23 particles. In one embodiment, many of the selectively removable particles are not joined to one another or in touching contact with one another, and particularly comprise less than or equal to about 50% by volume of the removable material 24, particularly less than about 25% by volume of the removable material 24 particles, and most particularly substantially all of the removable material 24 particles are not joined to one another or in touching contact with one another. In these embodiments, there is substantially no three-dimensional network of removable material 24 particles that are joined to one another or in touching contact with one another to facilitate the selective corrodibility of the removable material 24 and no interparticle electrochemical reactions that enable the corrosion or dissolution of the cellular nanomatrix as well as release or corrosion of the dispersed core particles by providing pathways by which the predetermined wellbore fluid 60 may penetrate the surface of the base cement article 20 to access the removable material 24 particles that are in the interior of the base cement article 20. In these embodiments, the pathways for the predetermined wellbore fluid 60 may be provided through the matrix of the matrix of hydraulic cement 23. In certain embodiments, the matrix of hydraulic cement 23 may be permeable to the predetermined wellbore fluid 60, thereby providing a pathway to enable the fluid to contact the removable material 24 and selectively corrode or dissolve and remove the removable material 24. In other embodiments, the base cement article 20 may include porosity sufficient to provide access of the predetermined wellbore fluid 60 to the removable material 24, thereby providing a pathway to enable the fluid to contact the removable material 24 and selectively corrode or dissolve and remove the removable material 24. This also provides a path for the predetermined fluid to contact, corrode and thereby selectively remove the removable particles that are disposed within the base cement article 20, and are located internally away from the surface of the base cement article 20.

Upon removal of the removable material 24, the space formerly occupied by the removable material 24 comprises a predetermined porosity 11 with the matrix of hydraulic cement 23, thereby defining the fluid permeable cement article 40. In embodiments where the removable material 24 comprises a three-dimensional network of removable material 24, the space comprises a three-dimensional network of porosity within a three-dimensional network of the matrix of hydraulic cement 23. Appropriate selection of the particle shapes, sizes, amounts and distribution of the matrix of hydraulic cement 23 and removable material 24 can be used to vary the nature of the predetermined porosity 11, including any porous network within the matrix of hydraulic cement 23. In one embodiment, the predetermined porosity 11 may comprise a distributed porosity, including a closed or partially closed cellular structure, wherein the pores are separated from one another, similar to a closed-cell foam. Alternately, the predetermined porosity 11 may comprise an open or interconnected porous network structure 90, wherein the pores 11 are interconnected, similar to an open-cell foam. The porous network structure 90 may have a predetermined pore size and distribution of open, interconnected cells of the matrix of hydraulic cement 23 and the porous network structure 90 may define a filter medium or porous barrier or porous conduit that enables flow of a fluid (F), such as a drilling, completion, stimulation, or production fluid, through the wall section 28 either into or out of the wellbore.

In another exemplary embodiment as shown in FIG. 6, the porosity may have any porous structure and define a network 90 of open cell or closed cell pores, or a combination of open and closed cell pores. The porous network 90 may have a predetermined pore size and distribution of open or closed cell pores in matrix of hydraulic cement 23.

The reconfigurable articles 10 disclosed herein may be used as any suitable article for any suitable application, including intermediate or end use applications, and more particularly are useful as reconfigurable downhole articles 10, including reconfigurable downhole tools and components and fixtures. Examples include, without limitation, various balls, plugs, sleeves, tubulars, liners, screens, sieves, formation packings, proppants and the like. In some embodiments, the reconfigurable downhole articles 10 may be reconfigured from the base cement article 20 to the fluid permeable cement article 40 downhole in the wellbore in conjunction with drilling, completion, stimulation, or production operations. In other embodiments, reconfigurable downhole articles 10 may be reconfigured prior to downhole placement.

Figure 7A:
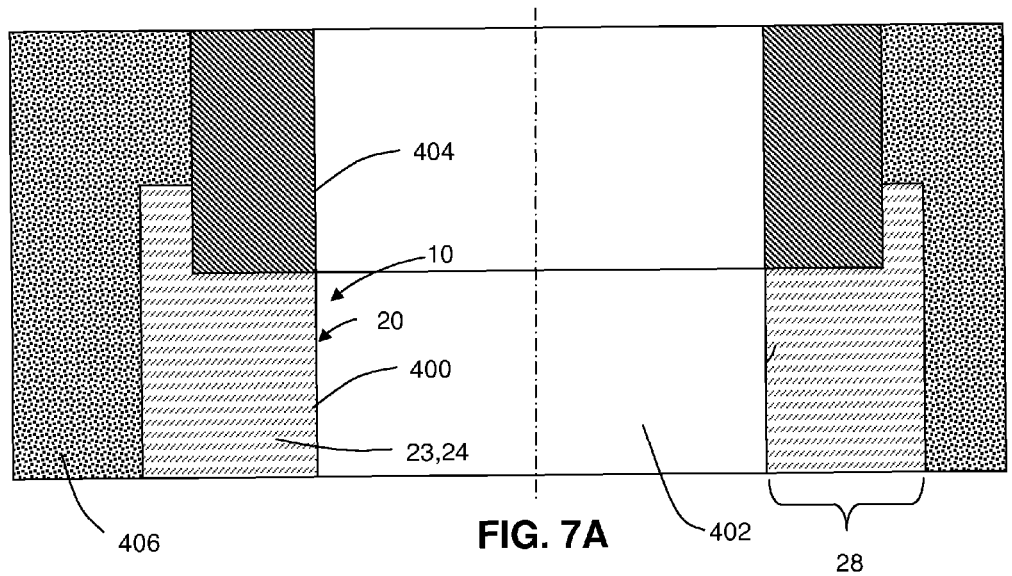
FIGS. 7A and 7B are schematic cross-sectional illustrations of an exemplary embodiment of a reconfigurable article comprising a porous cement wall section as disclosed herein.
Figure 7B:
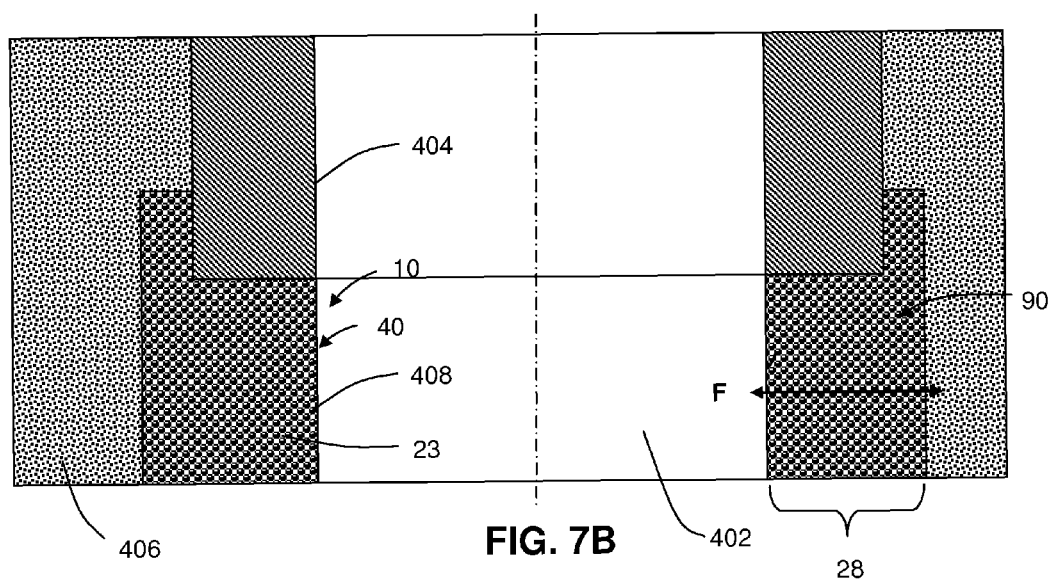

In one embodiment, as illustrated in FIGS. 7A and 7B, the form of the reconfigurable cement article 10 may comprise that of an annular wall section or tubular 400 that may be disposed to form part of the wellbore 402 together with tubular metal casing 404 or that may itself be used to define the wellbore 402 within a surrounding earth formation 406, either on a temporary or permanent basis. In this embodiment, the base cement article 20 may comprise a fluid impermeable tubular 400 as shown in FIG. 7A and may be reconfigured by removal of the selectively removable material 24 to form the fluid permeable article 40 and fluid permeable tubular 408 as shown in FIG. 7B to enable flow of fluid F into or out of wellbore 402 through the fluid permeable liner 412.

Figure 8A:
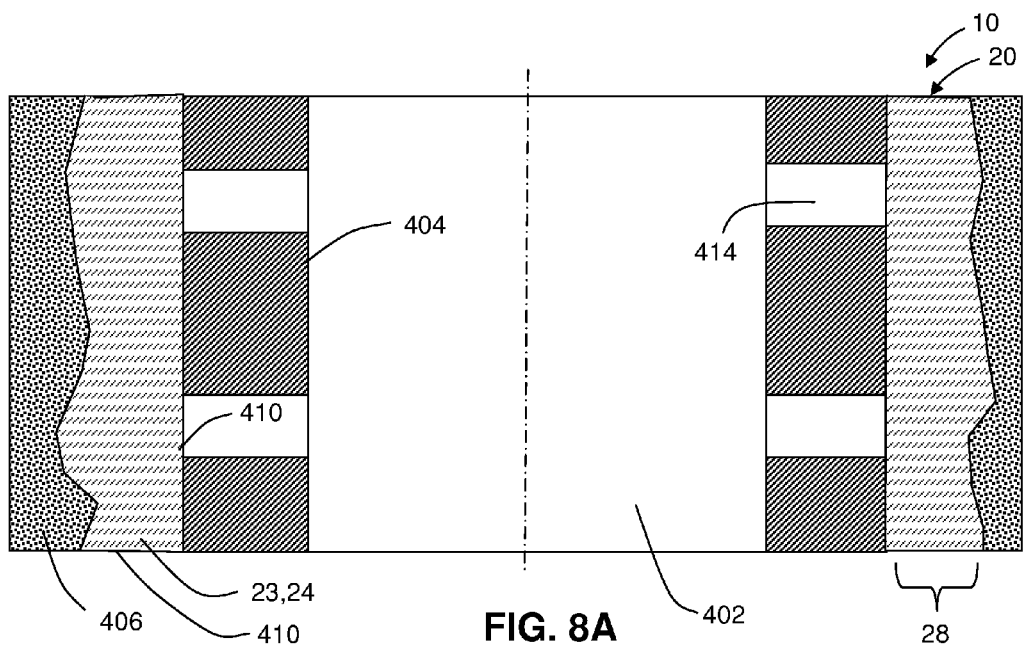
FIGS. 8A and 8B are schematic cross-sectional illustrations of an exemplary embodiment of a reconfigurable article comprising a porous cement liner as disclosed herein.
Figure 8B:
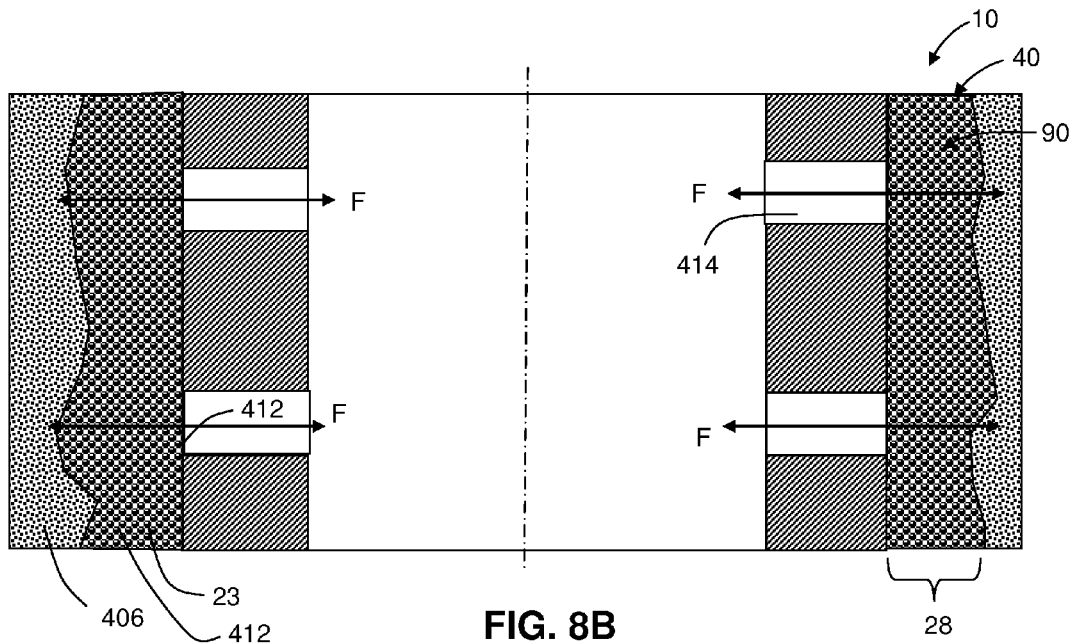

In another embodiment, as illustrated in FIGS. 8A and 8B, the form of the reconfigurable cement article 10 may comprise that of an annular liner 410 disposed around and filling the space between a wellbore casing 404 and a surrounding earth formation 406. In this embodiment, the base cement article 20 may comprise a fluid impermeable liner 410 as shown in FIG. 8A and may be reconfigured by removal of the selectively removable material 24 to form the fluid permeable article 40 and fluid permeable liner 412 as shown in FIG. 8B to enable flow of fluid F into or out of wellbore 402 through the fluid permeable liner 412 through fluid conduits 414.

Figure 9A:
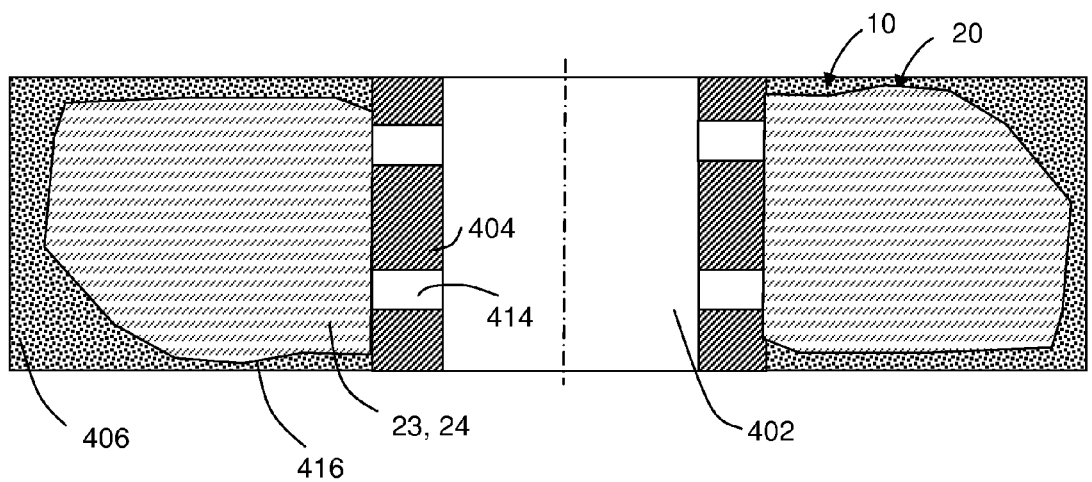
FIGS. 9A and 9B are schematic cross-sectional illustrations of an exemplary embodiment of a reconfigurable article comprising a porous cement packing as disclosed herein.
Figure 9B:
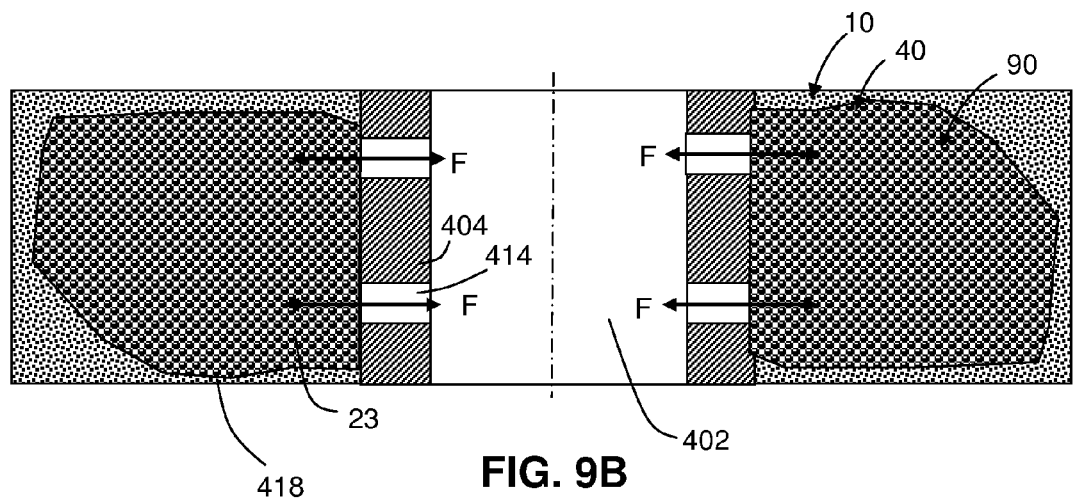

In another embodiment, the form of the reconfigurable cement article 10 may comprise that of a packing 416, including a packing 416 disposed between a metal wellbore casing 404 and an earth formation 406, wherein the packing 410 fills the space between the wellbore casing 404 and a surrounding earth formation 406, such as an unconsolidated earth formation. In this embodiment, the base cement article 20 may comprise a fluid impermeable packing 416 as shown in FIG. 9A and may be reconfigured by removal of the selectively removable material 24 to form the fluid permeable article 40 and fluid permeable packing 418 as shown in FIG. 9B to enable flow of fluid F into or out of wellbore 402 through the fluid permeable packing 418 through fluid conduits 414. The fluid permeable packing 418 may be configured so as to provide a function similar to a gravel pack, for example.

Figure 10A:
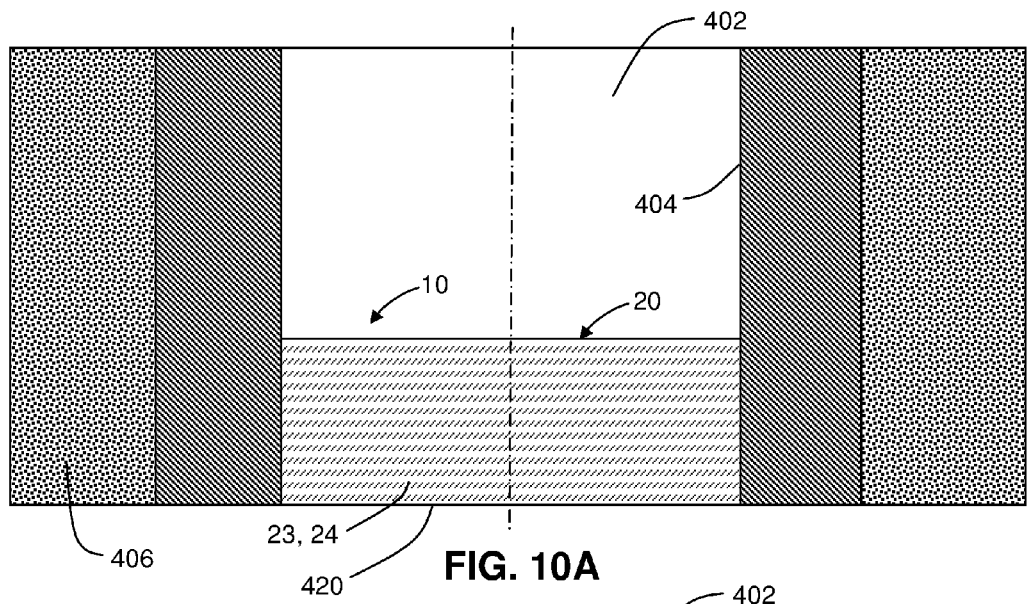
FIGS. 10A and 10B are schematic cross-sectional illustrations of an exemplary embodiment of a reconfigurable article comprising a porous cement plug as disclosed herein.
Figure 10B:
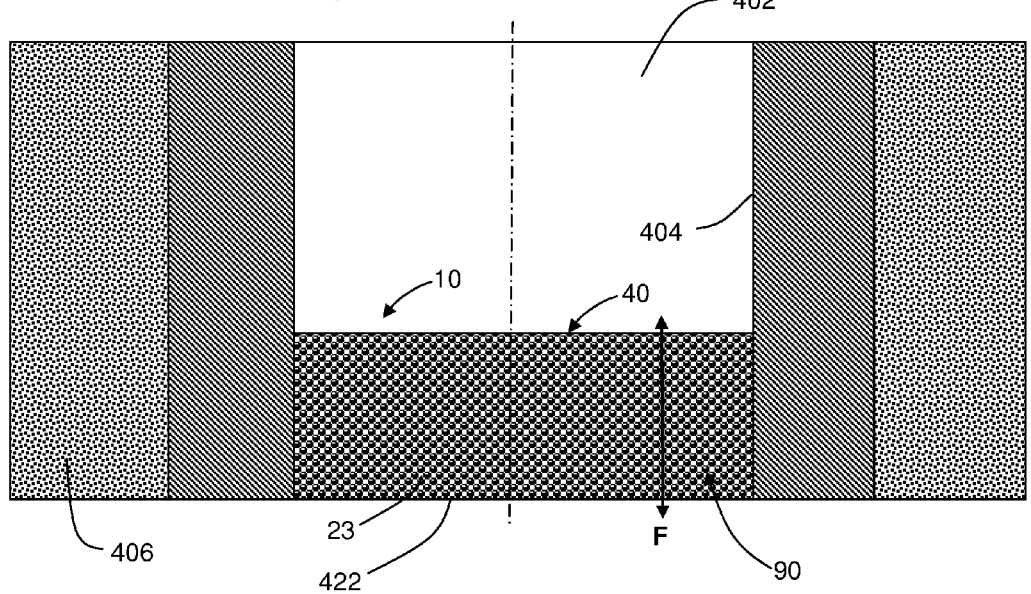

In yet another embodiment, the form of the reconfigurable cement article 10 may comprise that of a plug, including a plug 420 disposed within a metal wellbore casing 404 disposed in an earth formation 406 or a cement wellbore liner, including a fluid impermeable liner 410 or a fluid permeable liner 412, wherein the plug 420 fills the space within and thereby plugs a portion of the wellbore 406 and wellbore casing 404. In this embodiment, the base cement article 20 may comprise a fluid impermeable plug 420 as shown in FIG. 10A and may be reconfigured by removal of the selectively removable material 24 to form the fluid permeable article 40 and fluid permeable plug 422 as shown in FIG. 10B. The fluid permeable plug 422 may be configured so as to provide a function similar to a screen or filter, for example.

Figure 11A:
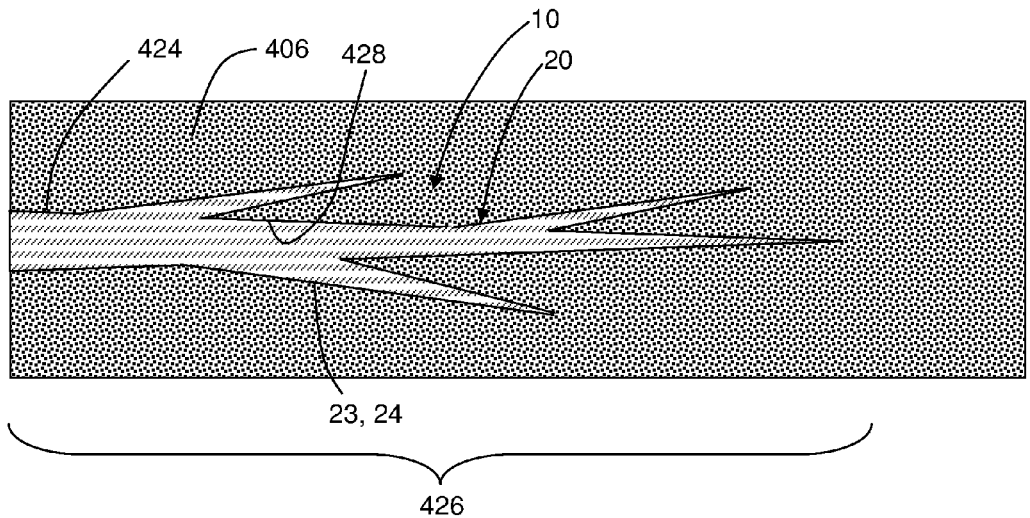
FIGS. 11A and 11B are schematic cross-sectional illustrations of an exemplary embodiment of a reconfigurable article comprising a porous cement proppant as disclosed herein.
Figure 11B:
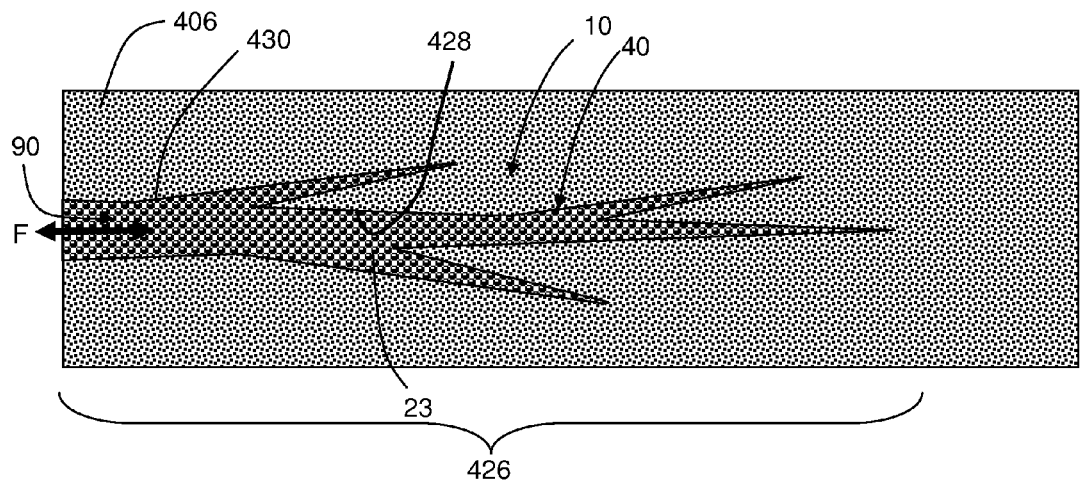

In yet another embodiment, the form of the reconfigurable cement article 10 may comprise that of a proppant 424, including a proppant 424 disposed within a fractured portion 426 of an earth formation 406, wherein the proppant 424 fills the space within the fractured portion 426 and acts to hydraulically force open the earth fractures in the fractured portion of the earth formation. In this embodiment, the base cement article 20 may comprise a fluid impermeable proppant 424 and may maintain the fractures 428 in a forced open condition once the cement sets or hardens as shown in FIG. 11A and may be reconfigured by removal of the selectively removable material 24 to form the fluid permeable article 40 and fluid permeable proppant 430 as shown in FIG. 11B. The fluid permeable proppant 430 may be configured so as to provide fluid conduits or passageways within the fractured portion 426 of the earth formation 406 that may be used, for example, to enable flow of fluid F into or out of the wellbore through the fluid permeable proppant 430 in conjunction with completion or production operations.

Figure 12:
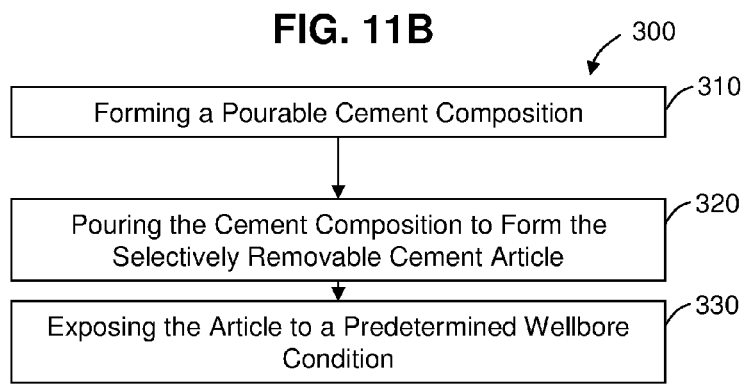
FIG. 12 is a flowchart of an exemplary embodiment of a method of forming a reconfigurable article as disclosed herein.

The reconfigurable articles 10 disclosed herein may be made by any suitable method. Referring to FIG. 12, an exemplary embodiment a method of forming a reconfigurable cement article 10 is disclosed. The method 300 includes forming 310 a pourable aqueous cement composition comprising a mixture of a hydraulic cement 23, water 26; and a selectively removable material 24 comprising a plurality of selectively corrodible metal powder particles dispersed within the cement or a nanomatrix powder compact, or a combination thereof, as described herein. The method 300 also includes pouring 320 the cement composition into a space form that is configured to receive it to form the reconfigurable cement article 10. The form may have any suitable shape and size. The method 300 may also include exposing 330 the reconfigurable cement article 10 to a predetermined wellbore condition 50 to remove the selectively removable material 24. In one embodiment, exposing 330 the article to a predetermined wellbore condition 50 comprises exposing the article to a predetermined wellbore fluid 60, including an acid, a completion fluid or a production fluid, as described herein. Exposing 330 may be performed at any predetermined time after the pourable cement composition is mixed, including, in one embodiment, while the pourable cement composition is setting after being formed. This may be accomplished in any suitable manner, for example, by incorporating a material, such as an acid or chloride compound into the cement composition. In another embodiment, exposing 330 may be performed after the pourable cement composition has been formed and has set, such as by exposing the cement composition to a predetermined wellbore fluid 60, as described herein. Any suitable predetermined wellbore fluid may be used to remove the removable material, including various drilling, completion, stimulation, and production fluids, and more particularly including water, an aqueous chloride solution, a brine, a formation fluid, an inorganic acid, an organic acid, and combinations thereof.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. A pourable aqueous cement composition, comprising a mixture of:
    a hydraulic cement,
    water; and
    a selectively removable material comprising a plurality of selectively corrodible metal powder particles other than aluminum particles having outer metallic coating layers dispersed within the cement or a selectively corrodible nanomatrix powder compact of metal powder particles other than aluminum particles having outer metallic coating layers disposed within the cement, or a combination thereof.

2. The cement composition of claim 1, further comprising sand or aggregate, or a combination thereof.

3. The cement composition of claim 1, further comprising a dispersant, a fluid loss additive, an accelerator, a retardant, an extender, a foaming agent, a weighting agent, a thixotropy control additive, a suspending agent or a degradation agent, or a combination thereof.

4. The cement composition of claim 1, wherein the selectively corrodible metal powder particles comprise: a particle core, the particle core comprising a core material that comprises Mg, Zn, Fe or Mn, or alloys thereof, or a combination thereof, and the outer metallic coating layer comprises a nanoscale metallic coating layer disposed on the particle core; or the nanomatrix powder compact comprises a metallic cellular nanomatrix of the outer metallic coating layers having a plurality of dispersed particles disposed therein comprising a particle core material that comprises Mg, Zn, Fe or Mn, or alloys thereof, or a combination thereof.

5. The cement composition of claim 4, wherein the metallic coating layer or the metallic cellular nanomatrix comprises Zn, Mn, Mg, Mo, W, Cu, Fe, Si, Ca, Co, Ta, Re or Ni, or an alloy thereof, or an oxide, carbide or nitride thereof, or a combination of any of the aforementioned materials, and wherein the metallic coating layer or the metallic cellular nanomatrix has a chemical composition and the particle cores or the dispersed particles have a chemical composition that is different than the chemical composition of the metallic coating layer or the metallic cellular nanomatrix.

6. The cement composition of claim 1, wherein the cement comprises a Portland cement, pozzolana cement, gypsum cement, high alumina content cement, silica cement or high alkalinity cement, or a combination thereof.

7. The cement composition of claim 1, wherein the cement comprises about 20% to about 80% by weight of the composition.

8. The cement composition of claim 7, wherein the cement comprises about 30% to about 60% by weight of the composition.

9. The cement composition of claim 1, wherein the selectively removable material comprises from about 0.20 to about 64% by weight of the composition.

10. The cement composition of claim 9, wherein the selectively removable material comprises from about 2% to about 45.5% by weight of the composition.

11. The cement composition of claim 9, wherein the water comprises fresh water, salt water, brine or seawater, or a combination thereof.

12. The cement composition of claim 1, wherein the mixture is poured to form an article.

13. The cement composition of claim 12, wherein the article comprises a liner for a wellbore casing, a packing disposed between a metal wellbore casing or a cement wellbore liner and an earth formation, or a plug disposed within a wellbore casing.

14. The cement composition of claim 1, wherein the nanomatrix powder compact comprises a pellet, wire, continuous fiber, mesh, or screen.

15. An article, comprising:
    a hydraulic cement, wherein the hydraulic cement has at least partially set into a permanent form; and
    a selectively removable material dispersed within the cement, the selectively removable material comprising a plurality of selectively corrodible metal powder particles other than aluminum particles having outer metallic coating layers dispersed within the cement or a selectively corrodible nanomatrix powder compact of metal powder particles other than aluminum particles having outer metallic coating layers disposed within the cement, or a combination thereof, wherein the selectively removable material is configured for removal in response to a predetermined wellbore condition.

16. The downhole article of claim 15, wherein the article comprises a downhole article.

17. The downhole article of claim 16, wherein the removable material has been at least partially removed.

18. The downhole article of claim 17, wherein the downhole article comprises a fluid permeable downhole article.

19. The downhole article of claim 16, wherein the downhole article comprises a liner for a wellbore casing, a packing disposed between a metal wellbore casing or a cement wellbore liner and an earth formation, a plug disposed within a wellbore casing or a proppant material.

20. The downhole article of claim 19, wherein the removable material has been at least partially removed.

21. The downhole article of claim 20, wherein the downhole article comprises a fluid permeable liner for a wellbore casing, a fluid permeable packing disposed between a metal wellbore casing or a cement wellbore liner and an earth formation, a fluid permeable plug disposed within a wellbore casing or a fluid permeable proppant.

22. The downhole article of claim 15, wherein the nanomatrix powder compact comprises a pellet, wire, continuous fiber, mesh, or screen.

23. A method of forming a reconfigurable cement article, comprising:
    forming a pourable aqueous cement composition comprising a mixture of: a hydraulic cement, water; and a selectively removable material comprising a plurality of selectively corrodible metal powder particles other than aluminum particles having outer metallic coating layers dispersed within the cement or a selectively corrodible nanomatrix powder compact of metal powder particles other than aluminum particles having outer metallic coating layers disposed within the cement, or a combination thereof; and
    pouring the cement composition into a space form that is configured to receive the cement composition to form the article.

24. The method of claim 23, further comprising exposing the article to a predetermined wellbore condition to remove the selectively removable material.

25. The method of claim 24, wherein exposing the article to a predetermined wellbore condition comprises exposing the article to a predetermined wellbore fluid.

26. The method of claim 25, wherein the predetermined wellbore fluid comprises an acid, a completion fluid, a stimulation fluid or a production fluid.

27. The method of claim 24, wherein exposing is performed while the cement is setting.

28. The method of claim 24, wherein exposing is performed after the cement has set.

29. The method of claim 23, wherein the selectively corrodible metal powder particles comprise: a particle core, the particle core comprising a core material that comprises Mg, Zn, Fe or Mn, or alloys thereof, or a combination thereof, and the outer metallic coating layer comprises a nanoscale metallic coating layer disposed on the particle core; or the nanomatrix powder compact comprises a metallic cellular nanomatrix of the outer metallic coating layers having a plurality of dispersed particles disposed therein comprising a particle core material that comprises Mg, Zn, Fe or Mn, or alloys thereof, or a combination thereof.

30. The method of claim 29, wherein the metallic coating layer or the metallic cellular nanomatrix comprises Zn, Mn, Mg, Mo, W, Cu, Fe, Si, Ca, Co, Ta, Re or Ni, or an alloy thereof, or an oxide, carbide or nitride thereof, or a combination of any of the aforementioned materials, and wherein the metallic coating layer or the metallic cellular nanomatrix has a chemical composition and the particle cores or the dispersed particles have a chemical composition that is different than the chemical composition of the metallic coating layer or the metallic cellular nanomatrix.

31. The method of claim 23, wherein the article comprises a downhole article comprising a liner for a wellbore casing, a packing disposed between a metal wellbore casing or a cement wellbore liner and an earth formation, a plug disposed within a wellbore casing or a proppant material.

32. The method of claim 31, wherein after exposing the downhole article to a predetermined wellbore fluid the downhole article comprises a fluid permeable liner for a wellbore casing, a fluid permeable packing disposed between a metal wellbore casing or a cement wellbore liner and an earth formation, a fluid permeable plug disposed within a wellbore casing or a fluid permeable proppant.

33. The method of claim 23, wherein the nanomatrix powder compact comprises a pellet, wire, continuous fiber, mesh, or screen.

34. A pourable aqueous cement composition, comprising a mixture of:
    a hydraulic cement,
    water; and
    a selectively removable material comprising a plurality of selectively corrodible coated metal powder particles having outer metallic coating layers dispersed within the cement or a selectively corrodible nanomatrix powder compact of metal powder particles having outer metallic coating layers disposed within the cement, or a combination thereof, wherein each of the selectively corrodible metal powder particles comprise a particle core comprising a core material and the metallic coating layer comprising a metallic coating material disposed on the particle core, and wherein the nanomatrix powder compact comprises a metallic cellular nanomatrix of a metallic nanomatrix material formed from the outer metallic coating layers having a plurality of dispersed particles of a metallic particle core material disposed therein, and wherein the core material and the coating material are different materials and the metallic nanomatrix material and the particle core material are different materials.

35. The cement composition of claim 34, wherein the core material comprises Mg, Al, Zn, Fe or Mn, or alloys thereof, or a combination thereof, and wherein the particle core material comprises Mg, Al, Zn, Fe or Mn, or alloys thereof, or a combination thereof.

36. The cement composition of claim 35, wherein the metallic coating material comprises Al, Zn, Mn, Mg, Mo, W, Cu, Fe, Si, Ca, Co, Ta, Re or Ni, or an alloy thereof, or an oxide, carbide or nitride thereof, or a combination of any of the aforementioned materials, and wherein the metallic nanomatrix material comprises Al, Zn, Mn, Mg, Mo, W, Cu, Fe, Si, Ca, Co, Ta, Re or Ni, or an alloy thereof, or an oxide, carbide or nitride thereof, or a combination of any of the aforementioned materials.

* * * * *